Aug. 4, 1942.    L. E. THIBEAULT    2,291,662
AUTOMATIC BRAKE SHOE ADJUSTER
Filed May 17, 1941
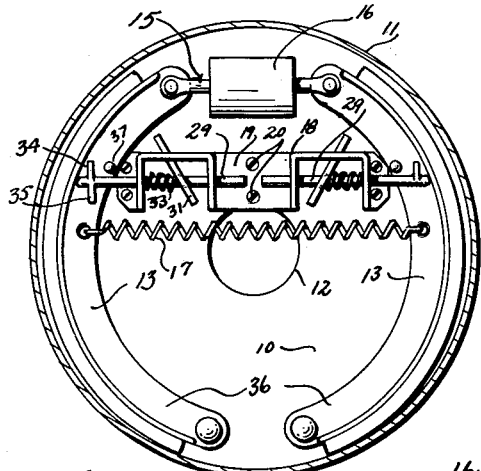
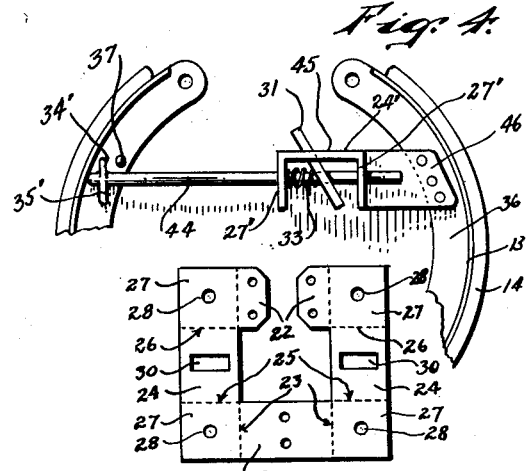
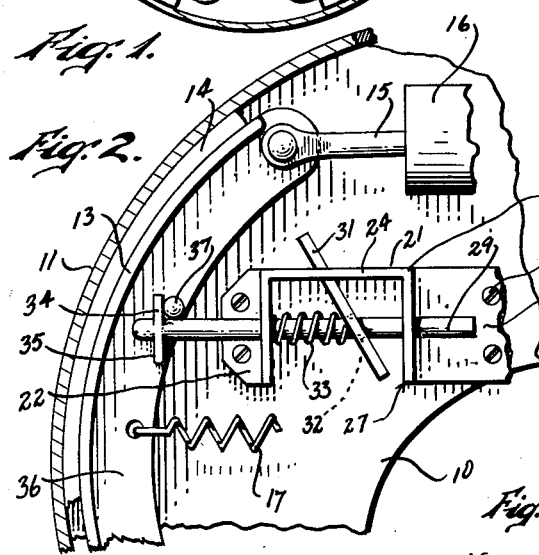
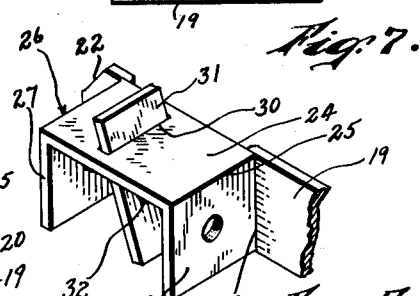
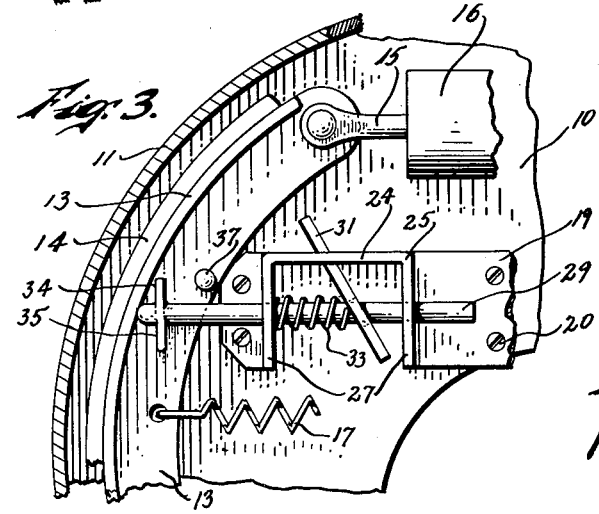
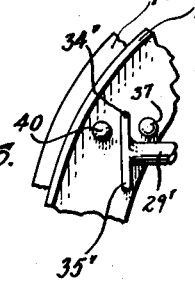
INVENTOR:
LEON E. THIBEAULT,
BY: Horace S. Woodward,
ATTORNEY.

Patented Aug. 4, 1942

2,291,662

UNITED STATES PATENT OFFICE 2,291,662

AUTOMATIC BRAKE SHOE ADJUSTER

Leon E. Thibeault, Flint, Mich.

Application May 17, 1941, Serial No. 393,999

2 Claims. (Cl. 188—79.5)

The invention relates to means for causing conventional brakes, such as now used for automobiles, trucks, and elsewhere, to automatically adjust themselves to a proper facing of the shoe and drum, or their equivalents, so that in normal operation of brake pedals, levers, links and the like, a normal movement of the brake applying means will insure a full application of the brake by reason of the automatic function of my invention.

I am aware that many attempts have been made, with more or less success, to present means for effecting this end, and it is therefore a most important aim of my invention to greatly simplify the means for attaining such aims, with the purpose in view of enabling its production at such reasonable cost that it may be readily incorporated in conventional brake systems, without unduly increasing the cost thereof, and whereby also, the device may be embodied in such a small and compact form that it may be readily mounted in the conventional brake assembly for individual wheels as at present used in automobiles.

A further important aim of the invention is to present a device of this kind which will be liable in a minimum degree to damage or impairment, by ordinary use, and shocks incident to the service to which automobiles are subjected. A further important aim of the invention is to present such a device which will be very certain in its function and which will be liable in a minimum degree to derangement by wear and otherwise.

It is an important aim of the invention to present a construction readily adapted to use in conventional hydraulic brakes and the like, as well as mechanically operated brakes.

Additional objects, advantages and features of invention reside in the construction, arrangement and combination of parts involved in the embodiment of the invention, as will be more readily understood from the following description and accompanying drawing, wherein Figure 1 is an elevational view of a brake assembly, conventionally illustrated, including the brake shoes and the brake cylinder, with a portion of a drum therearound.

Figure 2 is an enlargement of one of the elements and upper portion of the shoe, constituting the operative unit of my device.

Figure 3 is a view similar to Figure 2, showing the brake in released position.

Figure 4 is a view similar to Figure 1, of a modification, with the drum and brake cylinder omitted.

Figure 5 is a detail of the automatic clutch adjustment.

Figure 6 is a detail of a modified stop arrangement.

Figure 7 is a plan of the blank for the mounting of my adjuster.

Referring more particularly to the drawing, it may be explained that the parts of my adjusting device are shown relatively much larger in proportion to the size of the brake shoe and brake assembly than they would actually be made in practice, and the parts connected between the brake shoes are shown at a much lower level than is necessary, for convenience in illustration; and in actual practice the device as shown would be produced in such size as to be mounted in the space over the wheel hub and under the brake cylinder.

There is illustrated formally, a brake assembly plate 10, which would ordinarily be carried upon the end of the rear axle housing, or upon the forward spindle of a wheel mounting, and in Figures 1 to 3, inclusive, there is shown in section a brake drum 11, such as might be mounted upon a wheel disposed in proper operative relation to the brake shoes which are shown. The assembly plate 10 has a central opening 12, therein, through which the axle of a rear running gear unit, or the spindle of a forward unit, may project, as will be readily understood.

Pivoted on the lower part of the plate 10, in a conventional way, there are two brake shoes 13, having any usual friction facing 14 on their external surfaces, these shoes projecting upwardly and having respective links 15 extended from the conventional pistons of the brake system, which are enclosed in the cylinder 16, conventionally shown, the pistons not being illustrated. Connected between the two shoes, there is a contractile helical spring 17, by which the shoes of the brake are drawn to retracted or released position, although this spring may be otherwise located, as found most convenient, or separate spring devices used on each shoe to retract it.

Mounted on the plate 10, in a convenient location below the cylinder 16, there is a frame piece 18 for mounting two self-adjuster units, this frame piece being stamped integrally in one piece from sheet metal, the blank for which is illustrated in Figure 8, being substantially in the form of the letter U, although of rectangular form. The frame 18 includes a central planiform mounting plate portion 19, which constitutes the bight of the generally U-shaped blank, and is attached flat against the face of the plate 18 by suitable screws 20. In the blank, two sides members 21 spring from the base or the bight portion of the blank, extending in parallel relation, and at their extremities have ear portions 22 extending toward each other. In the formation of the frame 18, the side members 21 are bent upwardly at right angles to the plate 19, extending in parallel relation, this bend occurring on the dotted lines 23 transverse to the bight indicated in Figure 8. Each of the side members is then bent into a substantially U-shape, as shown at the right and left in Figure 1, and in larger detail in Figures 2 and 3, the bends in this instance occurring on the lines 25 and 26, the outer lines being spaced inwardly from the ends of the blank a distance corresponding to the vertical dimension of the base plate portion 19. The ear portions 22 are then bent outwardly at right angles, so that they extend in alinement with the plate portion 19, as shown in Figures 1 to 3, these ears being suitably apertured to receive screws 20. In the bending of the end portions of the side members of the blank, parallel guide ears or flanges 27 are formed, each having a central opening 28 therein, the openings 28 in the two ears 27 being alined with each other and receiving slidably therethrough a shoe rest and stop rod 29 formed preferably of a hard metal, there being thus two rods mounted on each frame plate 18. In the bending of the blank as described, there is thus provided between the guide ears 27 a bridge piece 24, constituting the bight of the U-shaped form into which each side member of the blank is bent. Each of these bridge portions has formed therein a transverse slot 30, located approximately midway of the length of the parts 24, and stopping short of the longitudinal edges of the frame piece. Set loosely in this slot for limited free movement longitudinally of the frame 18, there is a planiform clutch plate 31 which normally extends downwardly through the slot at an angle of 30 degrees, or less, and is formed with a smooth bored opening 32 therethrough, through which the rod 29 is slidably engaged. This opening 32 is but slightly larger than the rod 29, so that tendency of the end to move in the direction in which the lower rod of the plate 31 is inclined, will cause the edges of the opening to bind upon the rod, and the plate will be thrust against the side of the slot by further movement of the rod, resulting in stoppage of such further movement of the rod.

A protractile helical spring 33 is engaged loosely around the rod between the plate 31 and the outermost ear 27 in the frame 18 thereadjacent, so that the plate 31 is held yieldingly in its inclined position, and in constant pressing or stop relation to the rod, so as to prevent any movement thereof inwardly, but in the event that the rod should move outwardly, it will be free to do so by reason of the yielding of the spring and releasing action of the plate immediately upon any slight movement of the plate outwardly by the rod.

The rod is extended inwardly of the inner ear 27, in each instance, a suitable distance, having due regard for the possible extension of the rod incident to its brake adjusting function, and its outer end is extended a suitable distance to engage against the shoe 13 when the latter is in retracted or released position.

While the brake shoe may be formed with a suitable raised surface or other wear surface to engage the rod, this is not essential, and in the present instance, the rod is shown arranged to engage directly against the body of the shoe, as may be seen in Figures 1 and 3, when the brake is retracted. Formed on the rod adjacent its outer end, there is a shoulder or arm projection 34, at the upper side of the rod, and a similar one 35 is shown at the lower side of the rod, one only however, being used. The lower one, however, serves to engage against the side of the stiffening or reinforcing web or flange 36 of the brake shoe, so as to prevent the rod 29 from turning on its longitudinal axis. Fixed on the flange 36, spaced slightly above the rod 29, there is a pin or other strike device 37 normal to the flange, and the projection 34 and strike are arranged in such relation to the body portion of the shoe against which the rod engages, that the strike 37 will engage the projection 34 at the normal limit of full braking movement of the brake shoe and the operation of the hydraulic cylinder and connection 15. Consequently, in case the facing 14 becomes worn, the further movement of the brake shoe resulting therefrom will cause the strike 37 to press the projection 34 outwardly, drawing the rod 29 outwardly in the clutch plate 31, so that on the next release movement of the brake, the shoe will not return as far as the initial position of the brake shoe when the facing 14 was thicker.

Any usual means may be provided for centering the two shoes with respect to a drum, devices of this kind being available and understood in the art, and for that reason not being disclosed in detail.

In the operation of the device of Figure 4, under the functioning of the brake system, the shoes are pressed apart as in the first described form of the device, and on release are checked at the inner limit of their movement by engagement of the end of the rod 44 against the shoe adjacent its extremity, and in case of excessive wear of the brake facings, the pin 37 will engage the finger 34', drawing the rod 44 from the frame, the clutch plate 31 slipping thereon under action of the spring 33 as before, and holding the rod 34 at the position to which it is thus drawn. Thereafter, the retractive movement of the brake shoes will be correspondingly less, as will be readily understood, this being the function of all of the devices described.

Various other modifications of the adaptation of my invention to use may be made, as will be readily understood from the disclosures presented, it being understood also that various modifications in construction, arrangement and combination of parts, substitutions of materials and equivalents may be made without departing from the spirit of the invention, which is definitely stated in the appended claims.

In the modification shown in Figure 6, the sliding rod 29' is to be mounted in the same manner as the rod 29 of Figures 2 and 3, and is formed with upper and lower projections 34' and 35' having functions similar to those of the first described form. However, in addition to the striker pin 37 fixed on the flange 36 of the brake shoe, an additional thrust pin 40 is fixed on the flange 36 spaced horizontally outward from the pin 37, the projection or finger 34' being located between the two pins and movable with the same limits as the finger 34 of the first described form. In the operation of this device the release movement of the brake shoe is stopped by engagement of the pin 40 against the finger 34', and compensation for wear of the shoe facing is gained by operation of the finger 37, as before.

In Figure 4 there is illustrated a further modification in which the slidable mounting of the rod element is fixed on one brake shoe, and the rod is extended therefrom and otherwise constructed and arranged for coaction with the opposite brake shoe, in the same manner that the rod 29 coacts between the assembly plate 10 and the respective shoe against which it engages, in Figures 1 to 3, and it may be also modified in the manners shown in Figure 6. In this instance the mounting for the rod 44, which corresponds to the rod 29 first described, comprises a frame part 45, including parts 24' and 27' similar to those numbered 24 and 27, and in the same relation to each other, having the rod 44 mounted slidably through the members 27' with a clutch plate 31 and spring 33 similarly arranged and functioning as before described. The U-frame 45 is formed with a foot flange 46 which is connected to the reinforcing flange 36 of the shoe 13 at one side of the wheel unit, the frame part 45 thus being a floating element movable with the shoe on which its foot flange is secured. The rod 44 is suitably elongated and formed with fingers 34' and 35' corresponding to those 34 and 35 first described, the strike pin 37 being mounted on this shoe as, and in the same relation to the body of the shoe and finger 34' as described in the first three views.

I claim:

1. An automatic brake shoe adjuster for brakes of the character described consisting of a support to be mounted on a brake assembly plate and the like adjacent a brake shoe, a stop member slidably mounted on the support for movement toward and away from said shoe in the general direction of operative movement of the shoe and having a portion projected a substantial distance from the support toward the shoe to engage the inner side of the shoe when the latter is released, as a stop, a constantly engaged clutch device mounted on the support engaged with the inner part of the stop member to hold the stop member against movement in the direction of release movement of the shoe, a lateral arm projection on the stop member adjacent its shoe-engaging part arranged to lie close beside the shoe flange, and a strike projection on the shoe transverse to the stop member constructed and arranged to lie at one side of and clear of the stop member, spaced inwardly of said lateral arm projection on the stop member, whereby the brake shoe is free for withdrawal translatively free of the stop member.

2. The structure of claim 1 in which said lateral projection on the stop member consists of a finger part extending upwardly, and a finger part extending downwardly from said stop member whereby to lie beside the flange of a brake shoe and oppose rotation of the stop member on its axis.

LEON E. THIBEAULT.